United States Patent
Yong et al.

(10) Patent No.: US 7,117,961 B2
(45) Date of Patent: Oct. 10, 2006

(54) DYNAMIC SEAL WITH SOFT INTERFACE

(75) Inventors: Zhou Yong, Spring, TX (US); Dean Peter deRimanoczy, Spring, TX (US)

(73) Assignee: Smith International, Inc., Houston, TX (US)

( * ) Notice: Subject to any disclaimer, the term of this patent is extended or adjusted under 35 U.S.C. 154(b) by 237 days.

(21) Appl. No.: 10/631,530

(22) Filed: Jul. 31, 2003

(65) Prior Publication Data

US 2005/0023042 A1    Feb. 3, 2005

(51) Int. Cl.
*E21B 10/22*   (2006.01)
(52) U.S. Cl. ............. 175/371; 175/372; 277/406; 277/404
(58) Field of Classification Search ........ 175/371, 175/372; 277/406, 404, 442
See application file for complete search history.

(56) References Cited

U.S. PATENT DOCUMENTS

| | | | | |
|---|---|---|---|---|
| 1,756,285 A | * | 4/1930 | Decker | 175/369 |
| 2,373,352 A | * | 4/1945 | Smart | 205/131 |
| 3,268,312 A | * | 8/1966 | Grant | 65/443 |
| 3,280,027 A | * | 10/1966 | Owens et al. | 508/462 |
| 3,394,939 A | * | 7/1968 | Mastro | 277/309 |
| 3,655,425 A | * | 4/1972 | Longo et al. | 75/230 |
| 3,761,145 A | | 9/1973 | Schumacher, Jr. | 308/8.2 |
| 3,941,903 A | * | 3/1976 | Tucker, Jr. | 427/451 |
| 3,990,525 A | | 11/1976 | Penny | 175/337 |
| 4,172,502 A | | 10/1979 | Van Nederveen | 175/369 |
| 4,176,848 A | | 12/1979 | Lafuze | 277/92 |
| 4,179,003 A | | 12/1979 | Cooper et al. | 175/371 |
| 4,199,156 A | | 4/1980 | Oldham et al. | 277/92 |
| 4,248,484 A | | 2/1981 | Newcomb | 308/8.2 |
| 4,249,622 A | | 2/1981 | Dysart | 175/277 |
| 4,252,330 A | | 2/1981 | Crow | 277/92 |
| 4,256,351 A | | 3/1981 | Langford, Jr. | 308/8.2 |
| 4,359,111 A | | 11/1982 | Gonzalez | 175/227 |
| 4,367,904 A | | 1/1983 | Olschewski et al. | 384/95 |
| 4,394,020 A | | 7/1983 | Oelke | 277/1 |
| 4,428,588 A | | 1/1984 | Oelke | 277/83 |
| 4,429,854 A | | 2/1984 | Kar et al. | 384/94 |

(Continued)

FOREIGN PATENT DOCUMENTS

EP    0335497    10/1989

(Continued)

OTHER PUBLICATIONS

Search Report for Appln. No. GB0416619.5.8, dated Apr. 11, 2004; (1 p.).

*Primary Examiner*—David Bagnell
*Assistant Examiner*—Shane Bomar
(74) *Attorney, Agent, or Firm*—Conley Rose, P. C.

(57) ABSTRACT

A device and method for dynamically sealing between rotatable members such as a rolling cone of a rock bit. The assembly includes a seal ring having a facing surface of a relatively hard material, such as hardened steel or tungsten carbide, and a second seal ring of a softer material, the softer material being harder, however, than typical elastomers. Suitable materials for the relatively soft seal ring include tin, copper, aluminum, magnesium, lead and alloys thereof, as well as non-metallic materials such as nylon-zytel, acetal, and polypropylene. The relatively soft seal ring may be affixed to a third seal ring or maybe affixed directly to the cone steel, for example. The seal assembly provides potential for longer life relative to elastomeric seals and requires less axial space along the journal surfaces than certain conventional metal seal assemblies.

56 Claims, 5 Drawing Sheets

U.S. PATENT DOCUMENTS

| | | | |
|---|---|---|---|
| 4,466,621 A | 8/1984 | Garner et al. | 277/84 |
| 4,466,622 A | 8/1984 | Deane et al. | 277/92 |
| 4,516,641 A | 5/1985 | Burr | 175/228 |
| 4,613,005 A | 9/1986 | Olsson | 175/371 |
| 4,629,338 A * | 12/1986 | Ippolito | 384/94 |
| 4,666,001 A | 5/1987 | Burr | 175/371 |
| 4,671,368 A | 6/1987 | Burr | 175/371 |
| 4,722,404 A * | 2/1988 | Evans | 175/371 |
| 4,747,604 A | 5/1988 | Nakamura | 277/83 |
| 4,753,303 A | 6/1988 | Burr | 175/367 |
| 4,753,304 A | 6/1988 | Kelly, Jr. | 175/371 |
| 4,762,189 A | 8/1988 | Tatum | 175/371 |
| 4,813,502 A | 3/1989 | Dysart | 175/337 |
| 4,822,057 A | 4/1989 | Chia et al. | 277/84 |
| 4,824,123 A | 4/1989 | Chia et al. | 277/84 |
| 4,838,365 A | 6/1989 | Kotch | 175/371 |
| 4,903,786 A | 2/1990 | Welsh | 175/367 |
| 4,923,020 A | 5/1990 | Kelly, Jr. et al. | 175/372 |
| 5,005,989 A | 4/1991 | Karlsson | 384/94 |
| 5,009,519 A | 4/1991 | Tatum | 384/94 |
| 5,027,911 A | 7/1991 | Dysart | 175/57 |
| 5,040,624 A | 8/1991 | Schumacher et al. | 175/371 |
| 5,080,183 A | 1/1992 | Schumacher et al. | 175/371 |
| 5,295,549 A | 3/1994 | Dolezal et al. | 175/371 |
| 5,360,076 A | 11/1994 | Kelly, Jr. et al. | 175/371 |
| 5,362,073 A | 11/1994 | Upton et al. | 277/92 |
| 5,392,692 A * | 2/1995 | Rao et al. | 92/246 |
| 5,472,058 A | 12/1995 | Hooper et al. | 175/371 |
| 5,791,421 A | 8/1998 | Lin | 175/371 |
| 5,875,861 A | 3/1999 | Daly et al. | 175/371 |
| 6,026,917 A | 2/2000 | Zahradnik et al. | 175/371 |
| 6,033,117 A | 3/2000 | Cariveau et al. | 384/94 |
| 6,068,070 A | 5/2000 | Scott | 175/428 |
| 6,109,376 A | 8/2000 | Pearce | 175/371 |
| 6,123,337 A | 9/2000 | Fang et al. | 277/336 |
| 6,142,249 A | 11/2000 | Zahradnik et al. | 175/371 |
| 6,170,830 B1 | 1/2001 | Cawthorne et al. | 277/336 |
| 6,176,330 B1 | 1/2001 | Burr | 175/371 |
| 6,179,296 B1 | 1/2001 | Cawthorne et al. | 277/336 |
| 6,196,339 B1 | 3/2001 | Portwood et al. | 175/371 |
| 6,247,545 B1 | 6/2001 | Burr et al. | 175/371 |
| 6,254,275 B1 | 7/2001 | Slaughter, Jr. et al. | 384/92 |
| 6,257,589 B1 * | 7/2001 | Flaherty et al. | 277/400 |
| 6,270,081 B1 * | 8/2001 | Onoda et al. | 277/442 |
| 6,427,790 B1 * | 8/2002 | Burr | 175/371 |
| 6,536,542 B1 | 3/2003 | Fang et al. | 175/371 |
| 6,598,690 B1 | 7/2003 | Peterson | 175/371 |
| 6,684,966 B1 * | 2/2004 | Lin et al. | 175/372 |
| 2003/0109646 A1 * | 6/2003 | Kubo et al. | 525/420 |
| 2005/0274549 A1 * | 12/2005 | Yong et al. | 175/371 |
| 2005/0274550 A1 * | 12/2005 | Yu et al. | 175/372 |

FOREIGN PATENT DOCUMENTS

WO    WO01/33117    5/2001

* cited by examiner

DYNAMIC SEAL WITH SOFT INTERFACE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates generally to seal assemblies for sealing between a rotating and a static member. In one aspect, and more particularly, the invention relates to seals for rolling cone bits used to drill a borehole for the ultimate recovery of oil, gas or minerals. Still more particularly, the invention relates to dynamic seals of multi-material construction that are employed to protect the bearing surfaces between the rolling cone cutters and the journal shafts on which they rotate.

2. Description of the Related Art

An earth-boring drill bit is typically mounted on the lower end of a drill string and is rotated by revolving the drill string at the surface or by actuation of downhole motors or turbines, or by both methods. With weight applied to the drill string, the rotating drill bit engages the earthen formation and proceeds to form a borehole along a predetermined path toward a target zone.

A typical earth-boring bit includes one or more rotatable cone cutters that perform their cutting function due to the rolling movement of the cone cutters acting against the formation material. The cone cutters roll and slide upon the bottom of the borehole as the drillstring and bit are rotated, the cone cutters thereby engaging and disintegrating the formation material in their path. The rotatable cone cutters may be described as generally conical in shape and are therefore referred to as rolling cones.

Rolling cone bits typically include a bit body with a plurality of journal segment legs. The rolling cones are mounted on bearing pin shafts (also called journal shafts or pins) that extend downwardly and inwardly from the journal segment legs. As the bit is rotated in the borehole, each cone cutter is caused to rotate on its respective journal shaft as the cone contacts the bottom of the borehole. The borehole is formed as the action of the cone cutters removes chips of formation material ("cuttings" or "drilled solids") which are carried upward and out of the borehole by the flow of drilling fluid which is pumped downwardly through the drill pipe and out of the bit. Seals are provided in glands between the rolling cones and their shaft to prevent lubricant from escaping from around the bearing surfaces and to prevent the cutting-laden, abrasive drilling fluid from entering between the cone and the shaft and damaging to the bearing surfaces. Liquid drilling fluid is normally used for oil and gas well drilling, whereas compressed air is generally used as the drilling fluid in mining operations. When cuttings are conveyed into the seal gland, they tend to adhere to the gland and/or seal component surfaces and may cause deformation, damage and/or slippage of the seal components. Moreover, the cuttings can accelerate abrasive wear of all seal components and of the bearing surfaces.

In oil and gas drilling, the cost of drilling a borehole is proportional to the length of time it takes to drill to the desired depth and location. The time required to drill the well, in turn, is greatly affected by the number of times the drill bit must be changed in order to reach the targeted formation. This is the case because each time the bit is changed, the entire string of drill pipes, which may be miles long, must be retrieved from the borehole, section by section. When a drill bit wears out or fails as a bore hole is being drilled, it is necessary to withdraw the drill string in order to replace the bit. The amount of time required to make a round trip for replacing a bit is essentially lost from drilling operations. Once the drill string has been retrieved and the new bit installed, the bit must be lowered to the bottom of the borehole on the drill string, which again must be constructed section by section. As is thus obvious, this process, known as a "trip" of the drill string, requires considerable time, effort and expense. It is therefore advantageous to maximize the service life of a drill bit in a rock formation. Accordingly, it is always desirable to employ drill bits that will be durable enough to drill for a substantial period of time with acceptable rate of penetration (ROP).

The durability of a bit and the length of time that a drill bit may be employed before it must be changed depends upon numerous factors. Importantly, the seals must function for substantial periods under extremely harsh downhole conditions. The type and effectiveness of the seals greatly impact bit life and thus, are critical to the success of a particular bit design.

One cause of bit failure arises from the severe wear or damage that may occur to the bearings on which the cone cutters are mounted. These bearings can be friction bearings (also referred to as journal bearings) or roller type bearings, and are typically subjected to high drilling loads, high hydrostatic pressures in the hole being drilled, and high temperatures.

As previously mentioned, the bearing surfaces in typical bits are lubricated, and the lubricant is retained within the bit by one or more seals. The seal is typically in the form of a ring and includes a dynamic seal surface that is placed in rotating contact against another surface and a static seal surface that is placed in contact against a stationary surface. Although the bit will experience severe and changing loading, as well as a wide range of different temperature and pressure conditions, the dynamic and static seal surfaces must nevertheless remain sealingly engaged in order to prevent the lubricant from escaping and/or contaminants from entering the lubricated areas, and should perform these duties throughout the life of the bit's cutting structure.

A variety of seal types are known in the art. These include O-ring type seals made entirely from a single type of rubber or other elastomeric material. The service life of bits equipped with such elastomeric seals is generally limited by the ability of the elastomeric seal material to withstand the different temperature and pressure conditions at each dynamic and static seal surface.

Another example of a conventional O-ring seal is one having a dynamic seal surface formed from a first type of elastomeric material, and a static seal surface that is formed from an elastomeric material different than that used to form the dynamic seal surface. The elastomeric material used to form the static seal surface may be less wear resistant than the material used to form the dynamic seal surface. Although such seal construction provides improved wear resistance at the dynamic seal surface when compared to single-elastomer seals, the amount of wear resistance and seal life that is provided is still limited by the properties inherent in the elastomeric materials.

More recently, certain metal-to-metal seals have been employed in certain rolling cone bits. Such metal-to-metal seals were developed in order to increase the working life of the bearings given that the failure of conventional elastomeric O-rings was one of the most frequent causes of bit failure, such failure manifesting itself in a loss or breakage of inserts on the rolling cone cutters, and even loss of entire cones. However, as compared to a conventional, elastomeric o-ring seal, the metal-to-metal seal assemblies have required substantially greater axial space along the journal surfaces in order position and retain the various components that make up the seal. In part, this increased axial space was required because such seal assemblies not only required the metal components that engage one another in providing the seal, but in addition required one or more spring-like "energizers" to cause the metal sealing surfaces to remain in engagement with one another. Some such energizers, to be effective, had to be relatively large. The space to retain these multiple-component assemblies is substantially greater than that necessary to house a single, elastomeric o-ring, for example. Relatively large diameter bits that included correspondingly large cone cutters could accommodate such multiple-component, metal-to-metal seal assemblies; however, in smaller sized bits, such as 8.5 inches in diameter and below, which account for a very large portion of bits made and employed, such space was hardly available, meaning that the bit designer was forced to accept design compromises. For example, the designer could employ the use of an elastomeric, o-ring seal with its relatively shorter life, or use a metal-to-metal seal with smaller than desired energizers due to the space limitations, or he could provide the space in the cone required for the desired metal-to-metal seal assembly, but at the expense of cone and leg strength due to the removal of additional cone steel and the relocation of bearings as required to house and retain the components.

Further, with respect to metal-to-metal seals, great care and attention must be employed in their manufacture to ensure that the engaging metal surfaces are extremely flat so as to ensure a good seal. Manufacturing such seals is time consuming and expensive. In many conventional designs, a lack of flatness in the engaging surfaces, misalignment of the engaging surfaces upon assembly or later use, and similar irregularities can be detrimental to seal life and thus to bit life.

It is therefore desirable that a new, durable and long lasting seal assembly be devised, one having the benefits offered by metal-to-metal seals, including long life and relative insensitivity to high temperatures, pressures and extreme forces, but not requiring such an axial length that either the seals cannot be properly energized, or that necessitates a removal of cone steel such that the cone or bearing surfaces are detrimentally weakened. Preferably, such seal assemblies would be constructed in a manner that would provide longer life than seals formed exclusively from elastomeric materials, and provide the enhanced life and wear resistance desired of metal-to-metal seals. Further still, it would be preferred that the components of the seal assembly yield manufacturing efficiencies and provide an ability to self-adapt and thereby maintain sealing engagement between the seal components despite the fact that the cone and seals will experience rapid changes in harsh drilling conditions.

Accordingly, to provide a drill bit with better performance and longer life, and thus to lower the drilling costs incurred in the recovery of oil and other valuable resources, it would be desirable to provide a seal that has the potential to provide longer life than conventional elastomeric seals, and at the same time, does not require as much axial space along the journal surfaces as compared to many conventional metal-to-metal seal assemblies. Preferably, such seals would provide a bit that will drill with acceptable ROP for longer periods than bits employing conventional seals so as to increase bit life and increase in footage drilled.

SUMMARY OF EXEMPLARY PREFERRED EMBODIMENTS

Described herein is a seal assembly for dynamically sealing between rotatable members, such as a rolling cone of a rock bit. One preferred seal assembly includes a first relatively soft but non elastomeric seal ring. The assembly further includes a second seal ring having a facing surface engaging the first seal ring as the two members rotate with respect to one another. The facing surface of the second seal ring is made of a material much harder than the first material, preferably, a material that is at least two or more times harder than the material of the first seal ring. In certain embodiments, the first seal ring is metallic, such as a ring made from tin, copper, aluminum, magnesium, lead and alloys thereof. The relatively soft seal ring may also be made of non metallic materials such as nylon-zytel, acetal and polypropylene. Preferred materials for the facing surface of the second seal ring include hardened steel and tungsten carbide. In certain embodiments, the seal assembly includes a pair of energizers causing the sealing surfaces to remain in engagement. The first seal ring may itself be secured to another seal ring of the seal assembly or, alternatively, may be secured within the body of one of the rotatable members, such as in a recess formed in the steel of the rolling cone cutter. Such a seal assembly requires less axial space by the elimination of assembly components.

Because of its relatively soft nature, the first seal ring is capable of deforming upon assembly of the rotatable members so as to provide an initial dynamic sealing surface despite the existence of surface irregularities on the sealing surfaces. Thereafter, in use, the relatively hard facing surface of the second seal ring acts to lap and thereby make planar the opposing surface of the relatively soft seal ring so as to maintain dynamic sealing engagement between the surfaces. As use continues, the relatively soft material of the first seal ring may be worn away by the relative movement of the harder material to the extent that the facing surface of the second seal ring eventually engages and seals with the material retaining the first, relatively soft, seal ring. In certain embodiments it is preferred that the retaining material to which the first seal ring is secured is a material having hardness greater than the hardness of the first seal ring, but less than the hardness of the facing surface of the second seal ring.

The seal assemblies described herein offer the potential for enhanced seal and bit life as compared to conventional elastomeric seals. Further, certain embodiments offer substantial axial space savings such that the seal assembly may be employed in even relatively small bit sizes. Further still, providing a seal assembly as herein described creates a dynamic seal where the components are self adapting to form and maintain dynamic sealing faces as the dynamic and kinematic conditions affecting the rotatable components undergo substantial changes, and as the relative geometric positions between the various seal components and the pressures exerted between them change during use.

Embodiments described herein thus comprise a combination of features and advantages which overcome some of the deficiencies or shortcomings of prior art seal assemblies and drill bits. The various characteristics mentioned above, as well as other features and characteristics described in more detail below, will be readily apparent to those skilled in the art upon reading the following detailed description of preferred embodiments, and by referring to the accompanying drawings.

BRIEF DESCRIPTION OF THE DRAWINGS

For a more detailed description of the preferred embodiments of the present invention, reference will now be made to the accompanying drawings, wherein.

DETAILED DESCRIPTION OF EXEMPLARY PREFERRED EMBODIMENTS

Figure 1:
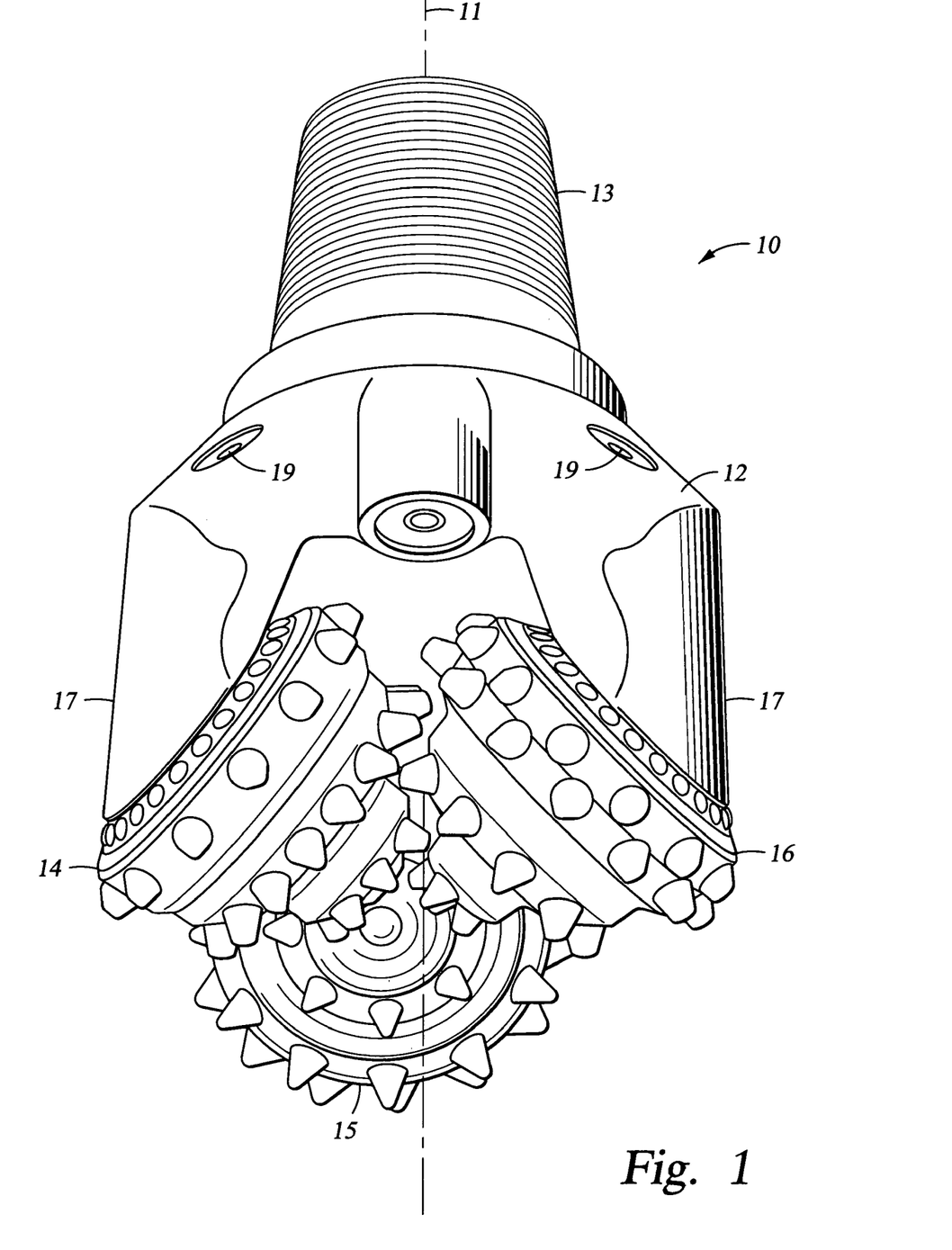
FIG. 1 is a perspective view of an earth boring bit.

Referring first to FIG. 1, an earth-boring bit 10 includes a central axis 11 and a bit body 12. Body 12 includes a threaded pin portion 13 on its upper end for securing the bit to the drillstring (not shown). Bit body 12 is composed of three sections, or legs 17 that are joined together to form bit body 12. Rotatably connected to body 12 are three rolling cone cutters, 14, 15, 16. Each cone cutter 14–16 is rotatably mounted on a journal pin or shaft 18 (FIG. 2) that is oriented generally downward and inward toward the center of bit 10. Each journal pin 18 and each cone cutter 14–16 is substantially the same, such that the description of one such journal pin 18 and one cone cutter 14 will adequately describe the others. It is to be understood that the description of the seal assemblies herein with respect to a three cone bit is for example only, and that the assemblies described herein may be employed in single cone bits, as well as bits having two or more cones. Likewise, the seals described herein may have application beyond drill bits and may be used wherever a shaft seal is required to seal between a rotatable member mounted on the shaft and a member that is stationary relative to the rotatable member.

Figure 2:
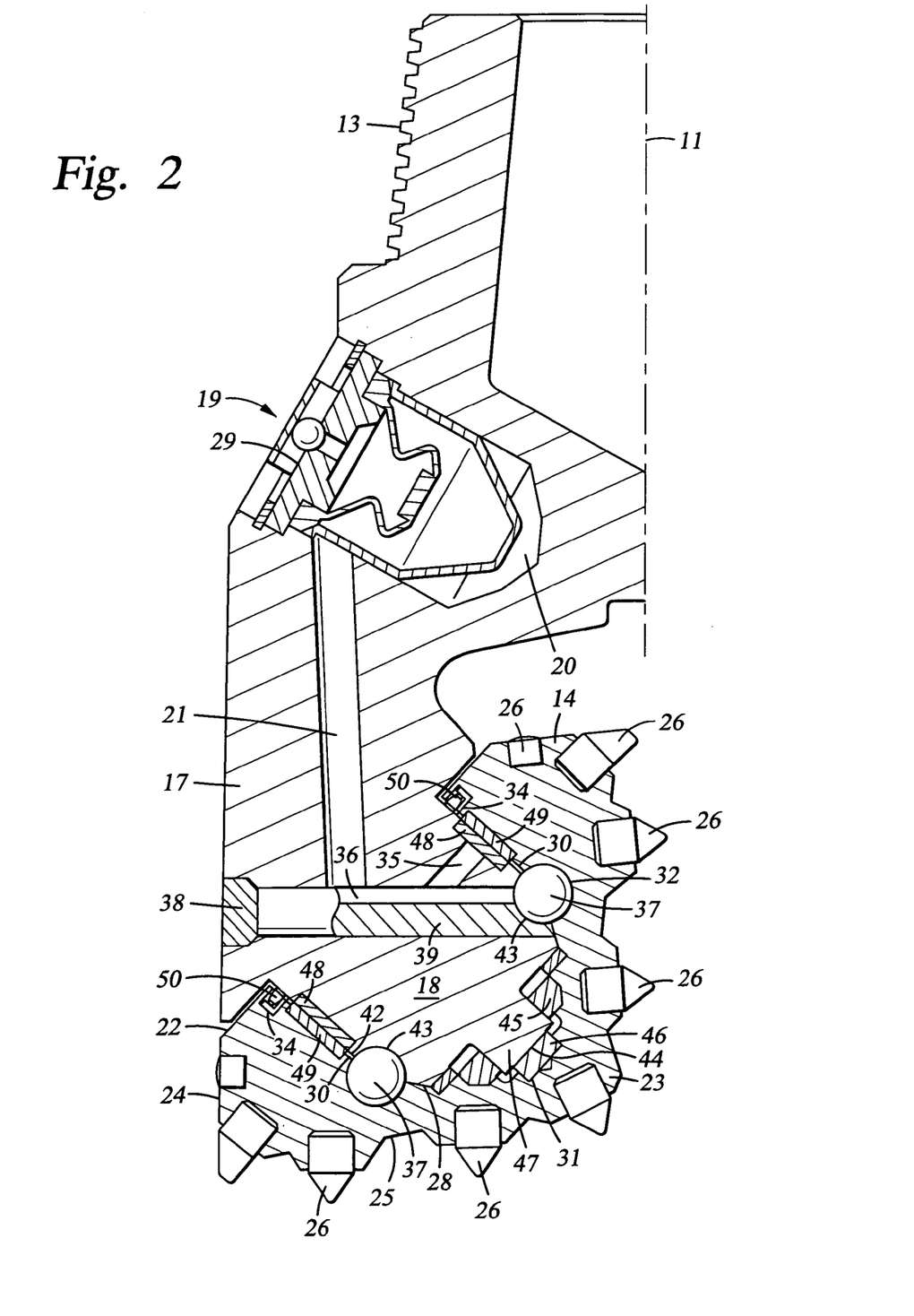
FIG. 2 is a partial section view taken through one leg and one rolling cone cutter of the bit shown in FIG. 1 and showing the seal assembly sealing between the rolling cone cutter and the leg of the bit body.

As best shown in FIG. 2, cone cutter 14 further includes a backface 22 and a nose portion 23 opposite backface 22. Cone 14 includes a frustoconical heel surface 24 and a generally conical surface 25 extending between heel surface 24 and nose 23. Secured within heel surface 24 and conical surface 25 are extending cutter elements which, as depicted in FIGS. 1 and 2, comprise inserts 26, such as inserts made of tungsten carbide. Although not shown, the seals described herein may likewise be employed advantageously in "steel tooth" bits, also sometimes referred to as "milled tooth" bits, where the cutter elements are formed from the cone material, such as by a milling process, and coated with a hard-facing material.

Referring still to FIG. 2, cone cutter 14 includes a central cavity or bore 28, which receives the journal pin 18. Central bore 28 includes a bearing surface 30 and end surface 31. Formed in bearing surface 30 is a circumferential groove 32 for receiving a plurality of locking balls 37. Bearing surface 30 further includes a seal assembly recess 34 formed adjacent to back face 22.

Journal pin 18 includes a bearing surface 42 that is substantially concentric to bearing surface 30 in cone 14. Bearing surface 42 includes a groove 43 for receiving locking balls 37. A ball passageway 36 intersects groove 32 and groove 43 and forms a means by which locking balls 37 are placed into cone 14 during assembly. Journal pin 18 further includes a reduced diameter portion 47 and end-surface 44. Bearing surface 42 of pin 18 and bearing surface 30 of cone 14 may include cylindrical inlays 48, 49, respectively, that are disposed in grooves formed in the respective parts for reducing friction, such inlays being made, for example, of aluminum bronze alloys. Upon assembly of the cone cutter 14 on pin 18, seal assembly 50 is disposed in seal assembly recess 34. A nose bushing 45 is disposed about reduced diameter portion 47 of pin 18 and the cone is inserted over the pin with nose button 46 positioned between end-surface 44 and the end portion 31 of central bore 28. Thereafter, locking balls 37 are inserted via passageway 36 into the raceway formed by grooves 32 and 43. The locking balls retain cone 14 on the journal pin 18. After the balls 37 are in place, ball retainer 39 is inserted through ball passageway 36 and an end plug 38 is welded or otherwise secured to close off the ball passageway 36.

The bearing structure described and shown FIG. 2 is generally known as a journal bearing. Other types of bits, particularly in bits having larger diameters and bits designed for higher rotational speeds, may include roller bearings disposed between the journal pin and the cone steel. It is to be understood that the seal assemblies described herein can be used with all types of rotary cone bits, including journal bearing and roller bearing bits, and in both rock bits and mining bits.

The bearing surfaces 30, 42 between the journal pin 18 and the cone 14 are lubricated by grease. The grease is applied so as to fill the regions adjacent to the bearing surfaces and to fill various interconnected passageways such that, upon bit assembly, air is essentially excluded from the interior of the bit. The bit includes a grease reservoir 19, including a pressure compensation subassembly 29 and a lubricant cavity 20 which is connected to the ball passageway 36 by lubricant passageway 21. The grease is retained in the bearing structure and the various passageways, including diagonal passageway 35 and passageways 21, 36, by means of seal assembly 50, shown schematically in FIG. 2 but described in more detail below. Likewise, seal assembly 50 prevents drilled cuttings and abrasive drilling fluid from passing seal assembly 50 and washing out the lubricant and damaging the bearing surfaces.

Figure 3:
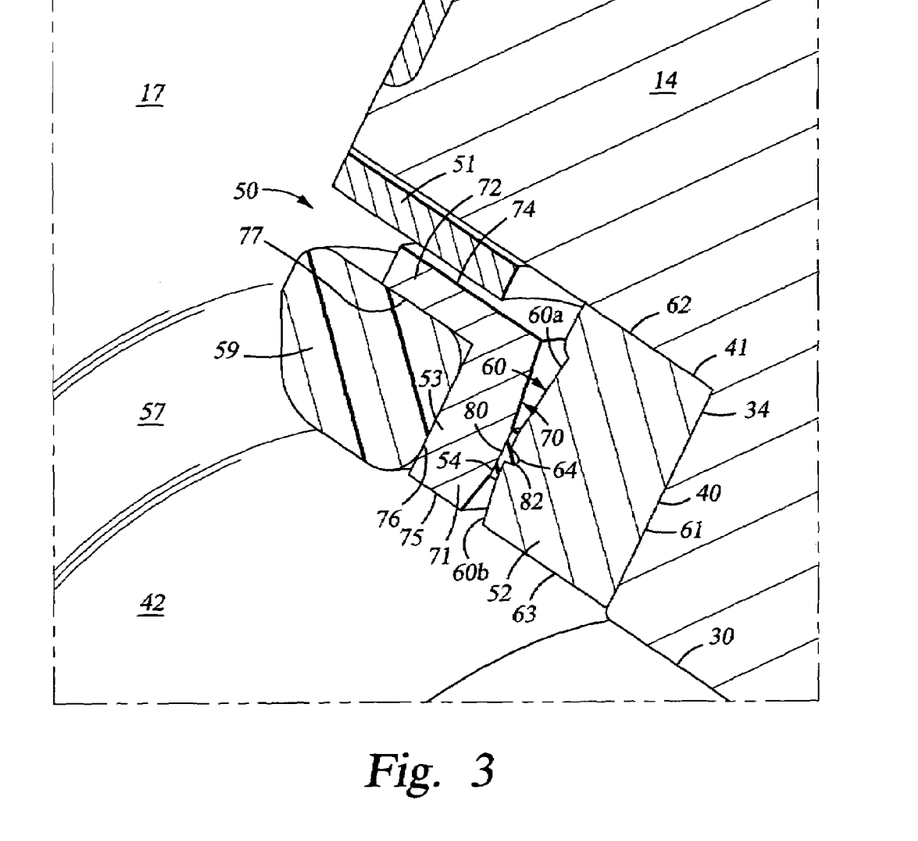
FIG. 3 is an enlarged perspective view, partly in cross-section, of the seal assembly shown in FIG. 2.

Referring now to FIG. 3, seal assembly 50 generally includes a dynamic seal ring 52, a static seal ring 53, and a dynamic seal ring 54 that is disposed between rings 52, 53. For convenience, seal ring 53 is referred to as static because it is substantially static related to bit body 17 and does not rotate about shaft 18. Similarly, seal rings 52, 54 are referred to as dynamic in this exemplary embodiment as they rotate relative to static ring 53. Seal assembly 50 further includes energizer 59. Seal assembly 50 is disposed in seal recess 34 between journal pin 18 and cone cutter 14. Recess 34 includes an annular surface 40, sometimes referred to herein as an axial surface that is substantially perpendicular to the axis of the bearing shaft 18. Recess 34 further includes an annular surface 41, sometimes referred to herein as a radial surface that is generally concentric with the generally cylindrical surface of the bearing shaft 18.

Dynamic seal ring 52 includes a facing surface 60, a base surface 61 and a pair of edge surfaces 62, 63. Seal ring 52 can be any shape. Facing surface 60 includes a channel or groove 64. The facing surface 60 is made of a material that is harder than the material forming dynamic seal ring 54 and, in the preferred embodiment shown in FIG. 3, the entire ring 52 is made of the same, relatively hard, material. For example, in this embodiment, ring 52 may be made from hardened stainless steel. Seal ring 52 is preferably pressed into the recess of a cone or is attached to a cone by the use of welding or epoxy.

Static seal ring 53 is generally L shaped in cross section and includes a base portion 71, an axially extending flange portion 72, facing surface 70, and annular edge surfaces 74, 75. Static seal ring 53 includes first and second energizer surfaces 76, 77, respectively. At least facing surface 70 of static seal ring 53 is made of a relatively hard and rigid material such as tungsten carbide or hardened stainless steel. In this preferred embodiment, the entire ring 53 is made of the same, substantially rigid and hard material.

Referring still to FIG. 3, seal ring 54 includes a generally planar facing surface 80 and an annular extension 82 that is retained in annular groove 64 of first seal ring 52. Annular extension 82 is preferably press-fit into groove 64 and retained by interference fit, although other securing means may be employed such as deposition of melt metal into groove 64 before a machining process or surface finishing. Dynamic seal ring 54 is made of a relatively soft material, one that is softer than the materials from which seal rings 52, 53 are manufactured.

Energizer 59 is made of an elastomer and, in its uncompressed state, has a generally circular cross-section. Upon assembly of cone 14 on journal pin 18, energizer 59 is disposed about pin 18 and placed within groove 57 formed in leg 17. Static seal ring 53 is disposed over journal pin in a position such that energizer surfaces 76, 77 engage and capture energizer 59. In this embodiment, leg 17 includes an annular extension 51, and upon assembly, flange portion 72 of static seal ring 53 is positioned between energizer 59 and annular extension 51.

As previously mentioned, dynamic seal ring 54 is retained in the facing surface 60 of dynamic seal ring 52. As cone 14 is thereafter mounted on journal pin 18, the facing surface 80 of dynamic seal ring 54 engages facing surface 70 of static seal ring 53. Placing cone 14 onto journal pin 18 squeezes energizer 59. Energizer 59 acts to urge facing surface 80 of dynamic seal ring 54 into engagement with facing surface 70 of static seal ring 53.

During assembly, seal ring 54, made of a softer material relative to seal ring 52 and 53, is compressed between the harder seal rings 52, 53. Due to this compression and its relative softness, seal ring 54 may deform somewhat such that its facing surface 80 may increase in surface area as compared to its uncompressed state. After the bit is assembled and placed in operation down hole, the bit, including the cones and seal assemblies, undergo substantial changes in dynamic and kinematic conditions. For example, the bit components must absorb substantial impact loads and compressive forces as weight is placed on bit and the bit rotated in the borehole. During such use, the contact areas and loads between the energizers and the seal rings of the seal assembly 50 will change, and the relative geometric positions between the seal components and the pressures exerted between them can change suddenly and dramatically. However, providing the relatively soft seal ring 54 between the relatively harder ring assemblies 52, 53 reduces the likelihood that damage will occur to the seal components because the softer material can absorb the impact and deform, such as by extrusion, to maintain dynamic sealing contact between facing surface 80 and facing surface 70. In this manner, the components of seal assembly 50 may be described as self-adapting to form dynamic sealing faces 70, 80, even when conditions change.

In this arrangement, seal ring 52 and relatively soft seal ring 54 rotate with the rotation of cone 14. By contrast, energizer 59 and static seal ring 53 remain stationary with respect to the cone leg 17. As such, the facing surface 80 of dynamic seal ring 54 moves rapidly across facing surface 70 of seal ring 53. The interface between facing surfaces 70, 80 provide a dynamic seal. In this arrangement, the static engagement of energizer 59 with leg 17 and with surfaces 76, 77 of seal ring 53 prevent loss of lubricant and ingress of drilling fluid between those static surfaces.

In part because the material selected for facing surface 80 of sealing ring 54 is relatively soft, such that it can deform to provide an adequate sealing face 80, facing surface 60 of dynamic seal ring 52 need not be lapped or otherwise machined to the degree of flatness otherwise required if the dynamic seal were to be provided by the engagement of facing surface 60 of ring 52 and facing surface 70 of ring 53. More specifically, in many conventional metal-to-metal seals, the facing surfaces of both engaging surfaces must be precisely lapped to create an exceedingly flat surface in order for the dynamic surfaces to properly seal. With the present design in seal assembly 50, facing surface 60 of first seal ring 52 need not be lapped to any substantial degree of flatness, given that the facing surface 80 of seal ring 54 engages ring 54 to form the sealing interface, and given that the relatively soft material of facing surface 80 will deform to the degree of flatness required for sealing with static seal ring 53. That is, as explained above, the soft material of facing surface 80 of seal ring 54 can easily deform under the compressive loads it experiences during drilling. Although surface 80 is formed to have a generally flat surface, imperfections or a lack of desired flatness are not detrimental and may be accounted for as the bit is in use, given that the relatively harder material of facing surface 70 of static seal ring 53 will itself act to lap facing surface 80 to the degree of flatness required for sealing. Preferably, the material chosen for facing surface 70 of static seal ring 53 will be at least two times harder than the material of facing surface 80 of dynamic seal ring 54. It is preferred that facing surface 70 be three or more times harder than facing surface 80 of seal ring 54.

Figure 4A:
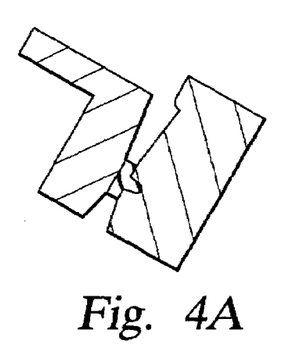
FIGS. 4A–4C are partial cross-sectional views showing the relationship between various seal components of the seal assembly shown in FIG. 3 as wear occurs to those components.
Figure 4B:
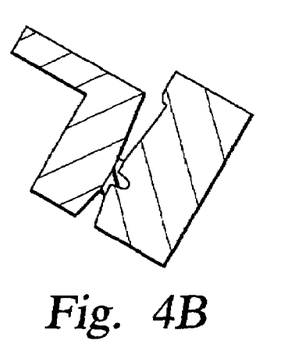
Figure 4C:
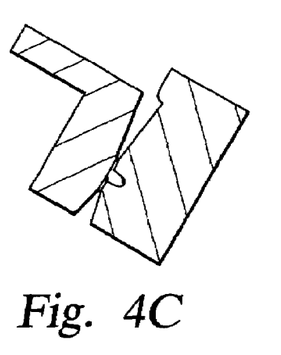

The seal assembly 50 shown in FIG. 3 may function for an extended period and provide an effective dynamic seal between facing surface 80 of seal ring 54 and facing surface 70 of static seal ring 53. Referring to FIGS. 4A–C, after an initial period of use, the relatively soft material of facing surface 80 will gradually be worn away due to the lapping it experiences by virtue of its rotation against the stationery and harder facing surface 70 of seal ring 53. In this way, seal ring 54 will gradually be reduced in thickness from its initial thickness shown in FIG. 4A to that shown in FIG. 4B. As use continues still further, ring 54 will be worn still further until seal rings 52–54 have the relationship shown in FIG. 4C in which facing surface 60 of seal ring 52 also engages facing surface 70 of static seal ring 53. In that instance, the dynamic sealing interface is formed by: facing surface 70 of static seal ring 53; the remaining portion of seal ring 54 (that portion retained in groove 64); as well as the facing surface 60 of seal ring 52. It is preferred that the material of seal ring 53 be harder than the material of facing surface 60 of seal ring 52 such that, as bit use continues still further, facing surface 60 of seal ring 52 will flatten as it is lapped and worn away by the harder material of facing surface 70.

There are a number of different tests by which the hardness of a material can be determined. The most recognized tests include the Rockwell Hardness Test, The Brinell Hardness Test, and the Vickers Hardness Test. The Rockwell Test is governed by ASTM E 18-98 (metals), C748-98 (graphites), D785-98 (plastics) and has units of HRA-HRV. The Brinell Test is governed by ASTM E10-98 (metals) and has units of HB or BHN. The Vickers Test is governed by ASTM E92-82 (1997)e1 (metals), C1327-99 (ceramics) and has units of HV.

Each of the hardness testers can measure the hardness of nearly any material (i.e. polymer, metal, ceramic), where each material is assigned a specific harness number (e.g. 479 HB or 513 HV or 50 HRC for Austenitic Stainless Steel). As used herein, the hardness of materials is expressed in terms of the Brinell Test, and thus expressed in units of HB.

Metals useful for forming relatively soft seal ring 54 include, but are not limited to, tin, lead, copper, aluminum, magnesium, and their alloys. Although the hardness of these materials differ and, to some extent, overlap (depending upon the particular alloy chosen), they generally have a hardness less than 100 HB and, more particularly, fall within the general range of about 3 to 80 HB. The softest of these metals are tin (and its alloys) having a hardness ranging from about 3 to 24 HB, and lead (and its alloys) having a hardness ranging from about 3.2 to 24 HB. In a preferred embodiment, soft seal ring 54 has a hardness ranging from 1 to less than 300 HB. By way of contrast, a conventional steel used in present day metal seals, such as 1018 steel, has a hardness of about 252 HB. Tungsten carbide generally is even harder. One typical tungsten carbide formulation has a hardness of approximately 612 HB. It should be noted, however, that various steels and steel alloys can be heat treated, such as through carbonization and tempering, to achieve hardnesses of certain tungsten carbide formulations.

Referring again to FIG. 3, and to provide a more specific example, one suitable combination of materials is as follows:

| | |
|---|---|
| Dynamic Seal Ring 52 | Hardened Steel having hardness of approximately 555 HB |
| Static Seal Ring 53 | Tungsten Carbide having hardness of approximately 733 HB |
| Dynamic (Soft) Seal Ring 54 | Tin alloy having hardness of approximately 8 HB |

As used herein, the term "metallic" means made from a metal or a metal alloy.

The relatively soft seal ring 54 may be made of materials other than metallic materials and still provide the desired dynamic seal. For example, seal ring 54 may likewise compromise the following non-metallic materials:

Nylon-Zytel (Rockwell hardness of approximately R119)
Acetal (Rockwell harness of approximately R119–122)
Polypropylene (Rockwell hardness of approximately R80–90)

When employed as part of the dynamic seal, these materials, like the relatively soft metals identified above, will deform somewhat upon assembly to accommodate for a lack of absolute flatness on the facing surfaces and, in use, will be lapped by the much harder material of facing surface 70 of static seal ring 53 so as to retain the flatness required for the dynamic seal.

It is to be understood that, although relatively soft seal ring 54 is shown in FIG. 3 as being retained in dynamic seal ring 52, it may alternatively secured within static seal ring 53 and remain stationary relative to bit leg 17. In that arrangement, it is desirable that facing surface 60 be lapped so as to have a high degree of flatness, whereas facing surface 70 of static seal ring 52 need not be as precisely lapped. In this example, it is desirable that the material of facing surface 60 of dynamic seal ring 52 be relatively hard in comparison to seal ring 54. Preferably, in this example, facing surface 60 had a hardness of at least two, and preferably three, times greater than the hardness of the material of seal ring 54. Likewise in this embodiment, it is preferred that the material of seal ring 53 be harder than the material forming seal ring 54, but be softer than the material of facing surface 60 of seal ring 52. In this manner, as the material of seal ring 54 is worn away during use, the harder material of facing surface 60 will act to lap facing surface 70 of seal ring 53 so as to retain a degree of flatness required for the dynamic seal. In this example, seal ring 52 may be made of tungsten carbide, while seal ring 53 is a hardened steel that retains a seal ring 54 made of a copper alloy, for example.

Figure 5:
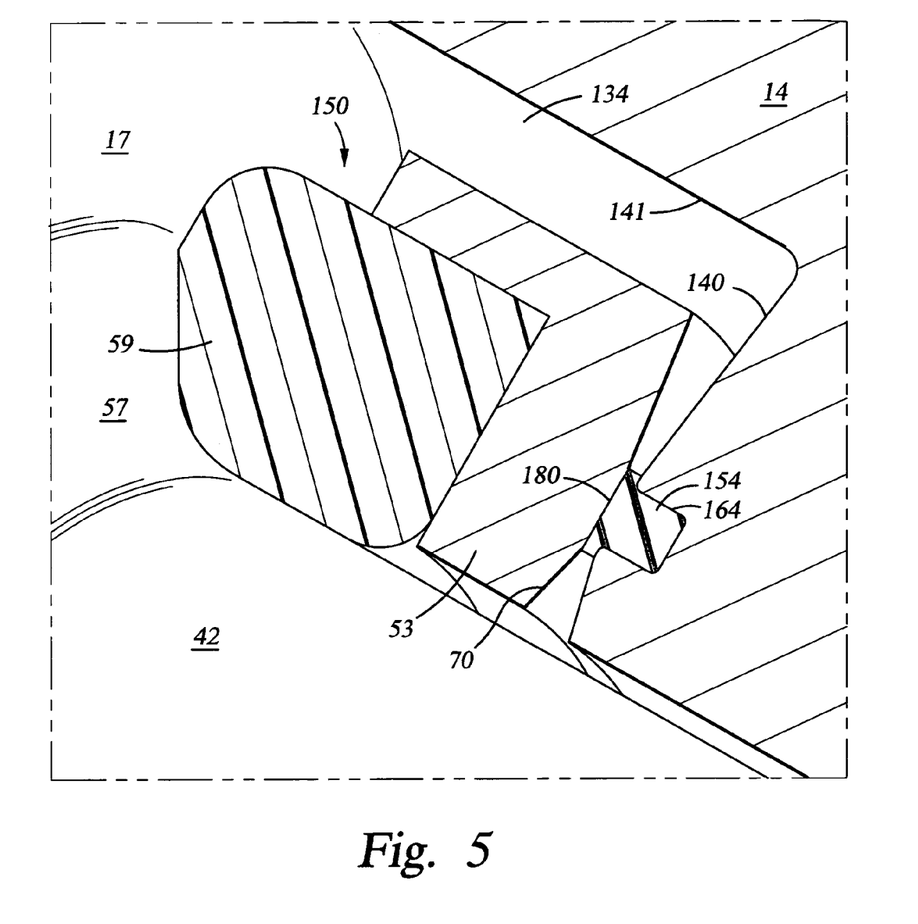
FIG. 5 is an enlarged perspective view, partly in cross-section, of an alternative seal assembly for sealing between the rolling cone cutter and bit body shown in FIG. 2.

Referring now to FIG. 5, another alternative seal assembly is shown. In this embodiment, cone 14 includes seal assembly 150 retained in seal recess 134, formed in cone 14. Seal recess 134 includes axial surface 140 and annular or radial surface 141. Cone 14 is retained on journal pin 18 extending from bit leg 17 in the manner previously described with respect to FIGS. 2 and 3. Seal assembly 150 includes energizer 59 and stationary seal ring 53 also as previously described. In this embodiment, however, seal assembly 150 does not employ a rotating seal ring 52 for retaining relatively soft seal ring 54. Instead, a relatively soft dynamic seal ring 154 is disposed in a retaining groove 164 that is formed in cone 14 and, more specifically, in axial surface 140. Relatively soft seal ring 154 is retained by interference fit within groove 164 or deposition of soft melt metal into the groove before surface finishing. Seal ring 154 includes facing surface 180 which engages facing surface 70 of stationary seal ring 53. Facing surface 70 is made of a material that preferably is two or more times harder than the material of seal ring 154. As previously described, the relatively soft material of seal ring 154 will deform to provide appropriate sealing engagement with facing surface 70 of ring 53. Further, because the material of facing surface 70 of seal ring 53 is substantially harder than that of seal ring 154, facing surface 180 of seal ring 154 will be lapped by seal ring 53 so as to retain the desired degree of flatness and to provide continued dynamic sealing engagement. An alternative is that seal ring 154 is lapped to a high accuracy of flatness before inserted into the groove.

As the material of relatively soft ring 154 gradually wears away, facing surface 70 of static ring 53 comes closer to engagement with axial surface 140 of seal recess 134. As wear continues, the hard metal of ring 53 wears away completely that portion of ring 154 that had separated axial surface 140 from facing surface 70 of ring 53, such that ring 53 begins to lap the axial surface 140 to form a conformingly flat sealing surface on surface 140.

In this embodiment, it is preferred that the material of facing surface 70 of ring 53 be selected so as to be harder than that of the cone steel 14. This enables the facing surface 70 of seal ring 53 to lap, and thereby flatten, the axial surface 140 of recess 134. As a more specific example, ring 53 may be made of a tungsten carbide having a hardness exceeding 600 HB. The cone steel, which may have undergone conventional heat treating, may have a hardness in the range of 536 HB. The material of seal ring 154 may be, for example, a tin alloy having a hardness of about 10 HB.

It will be understood that sealing assembly 150 of FIG. 5 provides substantial space savings as compared to the embodiment shown in FIG. 3 and compared to many conventional metal-to-metal seals which rely upon multiple ring components. Such space savings are achieved because the relatively hard seal ring 52 of the embodiment described with reference to FIG. 3 is not required. Such space savings in the axial direction is particularly important in the smaller sizes of bits, such as those having nominal diameters of 7⅞ inches and less, where the space available between the cone back face 22 and locking ball groove 42 (FIG. 2) is extremely limited.

The dynamic seal assemblies described herein employing one sealing surface that is much harder than the opposing facing surface may take a variety of shapes and configurations beyond those shown in FIGS. 4 and 5. As examples, a variety of alternative embodiments for such seals are shown in FIGS. 6A–6I. In each of these Figures, a relatively soft seal ring is shown secured to a retaining surface, the retaining surface being, for example, a seal ring such as dynamic seal ring 52 previously described with reference to FIG. 3 or an axial surface of the seal recess such as surface 140 formed in the cone steel as shown in FIG. 5. In each such arrangement, the seal assembly would include, a seal ring having a relatively hard facing surface opposing and engaging the facing surface of the relatively soft seal ring. It is preferred that the relatively hard facing surface be made of a material that is harder than the retaining surface to which the relatively soft seal ring is secured. Although not shown, in FIGS. 6A–6I, energizers may be included in the depicted seal assemblies to appropriately bias the sealing faces into engagement with one another.

Figure 6A:
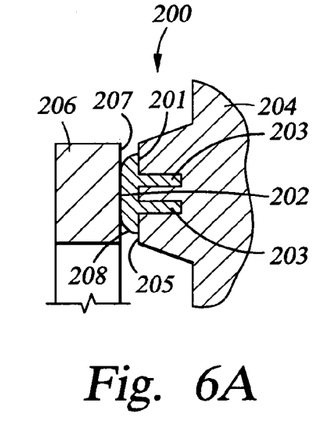
FIG. 6A–6I are enlarged cross sectional views of further alternative embodiments for the seal assembly that may be employed in the drill bit of FIG. 2.

Referring now to FIG. 6A, seal assembly 200 is shown including a relatively soft seal ring 201 having facing surface 202 and two annular extensions 203 that are retained within facing surface 205 of retaining member 204. As mentioned above, member 204 may represent an annular seal ring, such as ring 52 shown in FIG. 3, or, may be an axial surface formed in the cone cutter. Seal assembly 200 further includes a seal ring 206 having facing surface 207 made of relatively hard material and engaging facing surface 202 of seal ring 201. As shown in FIG. 6A, facing surface 202 includes tapered edges 208. Annular extensions 203 are retained by interference fit within retaining member 204 or deposition of soft melt metal into the groove before surface finishing. It is preferred in this embodiment that the material of facing surface 207 of seal ring 206 be harder than facing surface 205 of retaining member 204 such that, as relatively soft material of seal ring 201 wears away, hard facing surface 207 will tend to lap facing surface 205 to retain a planar interface between the sealing surfaces. At the time when facing surface 207 engages facing surface 205, a dynamic seal nevertheless is maintained by the engagement of three different materials, the material of annular extensions 203, the material of facing surface 207 of hard seal ring 206, and the material of retaining member 204.

Figure 6B:
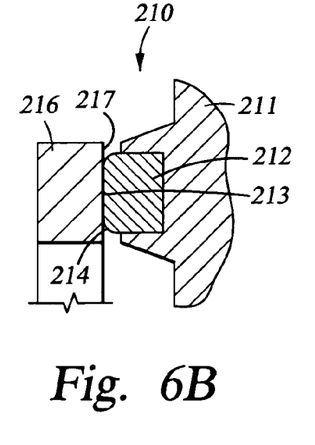

Another alternative embodiment is shown in FIG. 6B wherein seal assembly 210 includes a relatively soft seal ring 212 retained in retaining member 211, and seal ring 216 with relatively hard facing surface 217. Seal ring 212 includes facing surface 213. Facing surface 213 includes tapered edges 214. Although not shown in this Figure, with the appropriate energizers biasing facing surface 213 into engagement with a relatively hard facing surface 217 of seal ring 216, facing surface 213 will gradually wear to a point that the facing surface 217 of seal ring 216 will begin to engage the facing surface of retaining member 211. When that occurs, the dynamic seal is affected via the engagement of three separate materials.

Figure 6C:
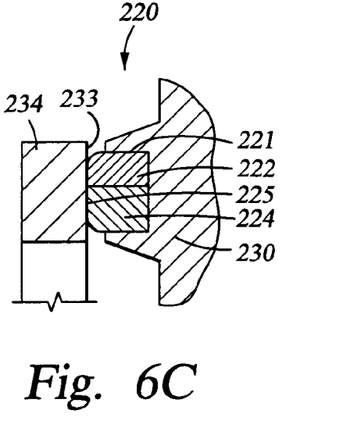

Referring now to FIG. 6C, depending upon the application, the relatively soft seal ring may itself be formed of differing materials. As shown in FIG. 6C, seal assembly 220 includes a relatively soft seal ring 221 that is comprised of an outer seal ring 222 and an inner seal ring 224 that are bonded together, as by interference fit. Collectively, rings 222, 224 are secured to retaining member 230 and present a facing surface 225 for engaging and sealing against the opposing facing surface 233 of a seal ring 234 having a hardness much greater than that of rings 222, 224. Preferably, the hardness of the facing surface 233 of the relatively hard seal ring 234 will be at least two or three times the hardness of each ring, 222 and 224. As between rings 222, 224, it is preferred that 224 be made of a harder material than ring 222. For example, 224 may be made of a copper alloy having a hardness of 30 HB with ring 222 being made of a tin alloy having a hardness of 15 HB. In this arrangement, as the seal surfaces 225, 233 engage one another and wear occurs, the harder material of seal 224 will slow the rate of wear of composite seal ring 221, and postpone the time at which the adjacent facing surface 233 of seal ring 234 engages the facing surface of retaining member 230. When these surfaces do engage, seal assembly 220 presents a dynamic seal provided by materials having four differing hardnesses.

Figure 6D:
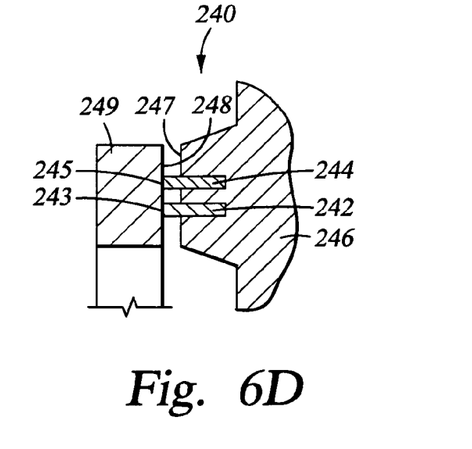

Seal assembly 240 shown in FIG. 6D presents a seal assembly having similar wear characteristics to that of FIG. 6C in that two concentric, spaced apart and relatively soft seal rings, 242, 244 are retained within a relatively hard retaining member 246 having facing surface 247. Rings 242 and 244 present facing surfaces 243, 245, respectively, that are positioned to engage relatively hard facing surface 248 of seal ring 249. It is preferred that ring 242 be made of a softer material than 244 and, in this embodiment, extend further from facing surface 247 of retaining member 246. In this manner, the dynamic seal is first formed by facing surface 243 engaging a relatively hard facing surface 248. As wear to ring 242 occurs, the facing surface 248 will also come to engage facing surface 245 of seal ring 244 such that materials having three different material characteristics are involved in creating the dynamic seal. Eventually, both rings 242 and 244 will wear to the point that their facing surfaces 243, 245 become co-planer with facing surface 247 of retaining member 246, such that the seal is achieved by use of four differing materials.

Figure 6E:
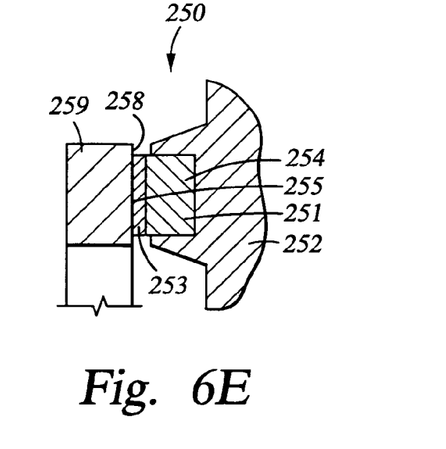
Figure 6F:
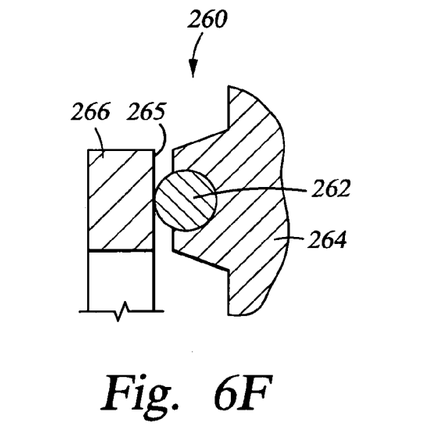
Figure 6G:
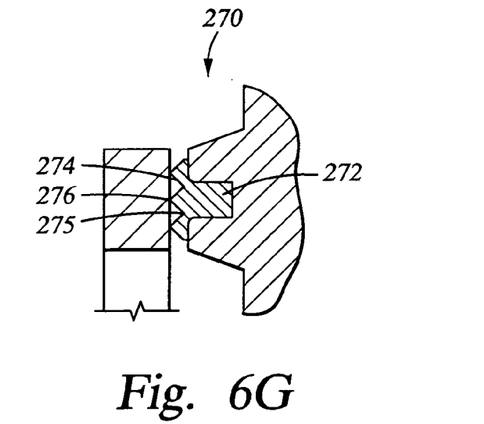

Changing the rate of wear of the relatively soft seal ring will likewise be achieved with the seal assembly 250 shown in FIG. 6E. In this embodiment, a relatively soft seal ring 251 is retained within a harder retaining member 252. Seal ring 251 comprises two rings 253, 254, of equal diameters. Outer ring 253 includes facing surface 255 which first engages the relatively hard facing surface 258 of opposing seal ring 259. It is preferred that ring 253 be made of a softer material than 254. Each ring 253, 254 is at least two or three times softer than the material of the facing surface 258 of the adjacent ring 259. Preferably too, retaining member 252 is harder than rings 253, 254, but not as hard as facing surface 258. In this arrangement, when the cone is first assembled, the softest of the materials in the seal assembly (excluding energizers) is first deformed and, as the bit is placed in service, is also first to wear. As ring 253 is worn entirely away, the material of ring 254 is lapped by the harder surface 258, and it forms a dynamic sealing engagement. As still further wear occurs, the sealing engagement is formed by facing surface of material 252, the coplanar portion of ring 251, and the facing surface 258 of seal ring 259.

Depending in part upon the relative hardness of the materials selected for the components of the seal assemblies described herein, the relatively soft seal ring may be quickly deformed and lapped to form a planer seal surface. Accordingly, the facing surface of such relatively soft seal ring need not be planer upon assembly, such that manufacturing demands are lessened. For example, referring to FIG. 6F, a seal assembly 260 includes a relatively soft seal ring 262 that is generally circular in cross-section and retained within a harder retaining member 264. The outer-most surface of seal ring 262 will quickly flatten upon initial assembly and be lapped by relatively hard facing surface 265 of seal ring 266 to form a planar, dynamic sealing interface therebetween. Likewise, referring to FIG. 6G, seal assembly 270 includes a relatively soft seal ring 272, having a facing surface 274 with circumferential grooves 275 formed therein. The grooves 275 and resulting peaks 276 (as shown in cross-section) initially provide concentric and spaced apart sealing surfaces. After wear occurs, seal member 270 will wear to have a relatively flat facing surface, such as that of seal ring 154 shown in FIG. 5.

Figure 6H:
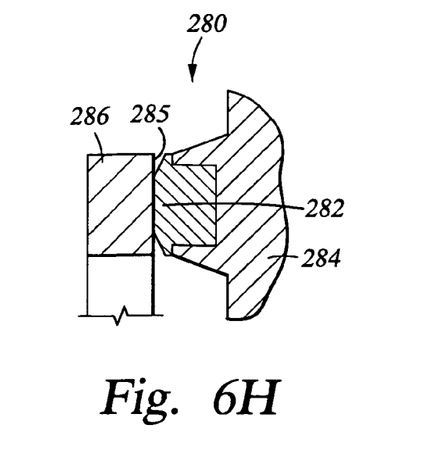

As previously mentioned, the relatively soft seal ring member may be secured to or within the material of adjacent seal components by a variety of means. For example, as shown in FIG. 6H, seal assembly 280 includes relatively soft seal ring 282 that is sintered with the retaining member 284. Alternatively, relatively soft material 282 may be a material applied, for example, in a molten state to retaining member 284. Because of the relatively soft nature of seal ring 282 relative to the harder facing surface 285 of adjacent seal ring 286, and the fact that it will quickly deform and be lapped to form a planar sealing surface, substantial effort need not be applied to assure that facing surface 283 of ring 282 is first manufactured to have a substantial degree of flatness.

Figure 6I:
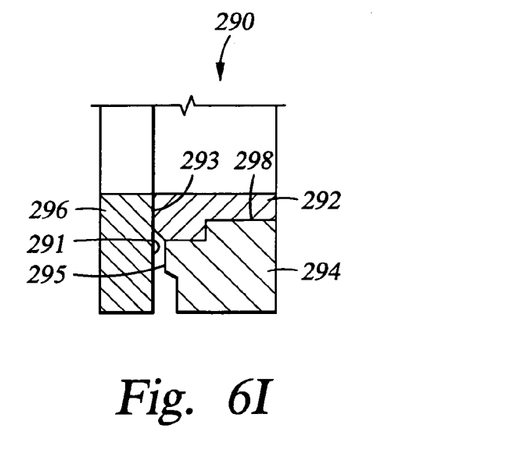

Referring now to FIG. 6I, seal assembly 290 is shown to include relatively soft seal ring 292 secured to a harder retaining member 294. In this embodiment, retaining member 294 includes a central bore 298, and ring 292 is a concentric ring affixed to surface 298. Relatively soft seal ring 292 includes facing surface 293 that, upon assembly of the bit, engages the relatively hard facing surface 291 of opposing seal ring 296. Facing surface 293 extends axially beyond facing surface 295 of retaining member 294. Upon assembly and initial use, facing surface 293 engages facing surface 291 to form the dynamic seal. As the relatively soft material of seal ring 292 wears, the much harder material of facing surface 291 of seal ring 296 will eventually come to engage facing surface 295 of retaining ring 294. Because facing surface 295 is not as hard as facing surface 291 of ring 296, it will tend to be lapped by the harder material, such that the dynamic seal will exist between the materials of retaining ring 294, relatively soft ring 292, and the opposing and harder facing surface 291 of ring 296.

The various embodiments of the seal assembly that have been described herein provide the potential for increased seal life as compared to conventional elastomeric o-ring seals. At the same time, the seal assemblies herein, given their relatively soft seal ring, provide the ability for the seal to adapt to dramatic changes in temperatures, pressures and loading, as experienced downhole, while maintaining sealing engagement. Further, certain embodiments described herein offer substantial axial space savings compared to many conventional metal to metal seals, enabling the seal assembly to be used in a wider variety of roller cone bits including sizes where conventional metal-to-metal seals were infeasible. Further, by properly choosing the materials for the facing surfaces of the components of the seal assembly, and in particular, by selecting materials of varying hardnesses, manufacturing efficiencies may be achieved as compared to many conventional metal-to-metal seals given that, in the embodiments disclosed herein, a relatively hard facing surface of one seal ring may itself act to lap and thus make planar any opposing facing surfaces in the seal assembly.

While various preferred embodiments of the invention have been showed and described, modifications thereof can be made by one skilled in the art without departing from the spirit and teachings of the invention. The embodiments herein are exemplary only, and are not limiting. Many variations and modifications of the apparatus and methods disclosed herein are possible and within the scope of the invention. Accordingly, the scope of protection is not limited by the description set out above, but is only limited by the claims which follow, that scope including all equivalents of the subject matter of the claims.

What is claimed is:

1. A dynamic seal assembly for sealing between a shaft and a rotatable member disposed on said shaft, the seal assembly comprising:
   a first seal ring having a facing surface made of a non-elastomeric material having a hardness less than 300 HB and greater than 1 HB;
   a second seal ring having a facing surface made of a material having a hardness of at least 300 HB;
   at least one resilient energizer urging said facing surfaces into engagement with each other.

2. The seal assembly of claim 1 wherein said facing surface of said first seal ring is made of a metallic material.

3. The seal assembly of claim 2 wherein said facing surface of said first seal ring is at least one metal chosen from the group consisting of tin, copper, aluminum, magnesium, lead, and alloys thereof.

4. The seal assembly of claim 1 wherein said facing surface of said first seal ring is a non metallic material chosen from the group consisting of Nylon-zytel, Acetal and Polypropylene.

5. The seal assembly of claim 2 wherein said facing surface of said second seal ring is made of steel.

6. The seal assembly of claim 2 wherein said facing surface of said second seal ring is made of tungsten carbide.

7. The seal assembly of claim 1 wherein said rotatable member includes a central cavity that receives said shaft and a recess in said cavity having an axial surface that is generally perpendicular to said shaft axis, wherein said first seal ring is attached to said axial surface.

8. The seal assembly of claim 7 wherein said axial surface includes an annular groove and wherein said first seal ring includes an extending portion that is retained in said groove by interference fit.

9. The seal assembly of claim 8 wherein said extending portion is made by melting metal into said groove.

10. The seal assembly of claim 9 further comprising surface finishing said metal in said groove.

11. The seal assembly of claim 7 wherein said axial surface includes a facing surface made of a material that is harder than said facing surface of said first seal ring and not as hard as said facing surface of said second seal ring.

12. The seal assembly of claim 11 wherein said axial surface is made of steel and said facing surface of said second seal ring is made of tungsten carbide.

13. A seal assembly for sealing between two members rotatable relative to one another about an axis of rotation, the assembly comprising:
a first seal ring having a facing surface made of a material having a first hardness greater than 3 HB and less than 250 HB, said first seal ring secured to a retaining material of a second hardness greater than said facing surface material of said first hardness wherein said facing surface of said first seal ring comprises a metallic material; and
a second seal ring having a facing surface engaging said first seal ring as said two members rotate relative to one another, said facing surface of said second seal ring being of a material having a third hardness that is at least two times harder than said first hardness.

14. The seal assembly of claim 13 wherein said first seal ring comprises at least one metal chosen from the group consisting of tin, copper, aluminum, magnesium, lead and alloys thereof.

15. A seal assembly for sealing between two members rotatable relative to one another about an axis of rotation, the assembly comprising:
a first seal ring of a material having a first hardness greater than 3 HB and less than 250 HB secured to a retaining material of a second hardness greater than said first hardness, wherein said first seal ring comprises at least one non metallic material chosen from the group consisting of Nylon-zytel, Acetal and Polypropylene, and
a second seal ring having a facing surface engaging said first seal ring as said two members rotate relative to one another, said facing surface of said second seal ring being of a material having a third hardness that is at least two times harder than said first hardness.

16. The seal assembly of claim 14 wherein said facing surface of said second seal ring is tungsten carbide.

17. The seal assembly of claim 14 wherein said facing surface of said second seal ring is hardened steel.

18. The seal assembly of claim 13 wherein said first seal ring comprises a plurality of concentric rings of materials having differing hardnesses.

19. The seal assembly of claim 18 wherein at least two of said plurality of concentric rings are secured to said retaining material in spaced apart relation to each other.

20. The seal assembly of claim 18 wherein at least two of said plurality of concentric rings are attached to each other.

21. The seal assembly of claim 18 wherein at least one of said plurality of concentric rings extends farther from said retaining material than other rings of said plurality.

22. The seal assembly of claim 18 wherein all of said rings of said plurality comprise at least one metal chosen from the group consisting of tin, copper, aluminum, magnesium, lead and alloys thereof.

23. The seal assembly of claim 13 wherein said first seal ring has a cross section that is substantially circular.

24. The seal assembly of claim 13 wherein said first seal ring is retained in said retaining material by interference fit.

25. The seal assembly of claim 24 wherein said retaining material includes at least one annular groove and said first seal ring includes an annular extension retained in said groove by interference fit.

26. The seal assembly of claim 13 further comprising a third seal ring, and wherein said retaining material forms a surface of said third seal ring.

27. The seal assembly of claim 13 wherein said retaining material forms a surface on one of said rotatable members that is generally parallel to said facing surface of said second seal ring and generally perpendicular to the axis of rotation.

28. The seal assembly of claim 27 wherein said retaining material is hardened steel and said facing surface of said second seal ring is tungsten carbide.

29. The seal assembly of claim 27 wherein said first seal ring comprises at least one non metallic material chosen from the group consisting of Nylon-zytel, Acetal and Polypropylene.

30. The seal assembly of claim 13 wherein said facing surface of said second seal ring sealingly engages said retaining material after said first seal ring wears.

31. The seal assembly of claim 13 wherein said facing surface of said second seal ring sealingly engages said material of said second hardness and sealingly engages said material of said first hardness.

32. The seal assembly of claim 18 wherein said facing surface of said second seal ring sealingly engages said plurality of concentric rings and sealingly engages said retaining material.

33. The seal assembly of claim 26 wherein said third seal ring includes a central aperture having an inner surface, and wherein first seal ring includes a portion disposed within said aperture and engaging said inner surface.

34. The seal assembly of claim 13 wherein said first seal ring includes a substrate beneath said facing surface of said first seal ring, the materials of said facing surface of said first ring and said substrate each having a hardness greater than 3 HB and less than 250 HB.

35. The seal assembly of claim 34 wherein said substrate is harder than the facing surface of said first seal ring.

36. A drill bit for drilling through earthen formations comprising:
a bit body;
a journal pin extending from said bit body;
a cone cutter rotatably mounted on said journal pin;
a seal assembly disposed between said journal pin and said cone cutter, said seal assembly comprising:
a first seal ring disposed about said journal pin and having a facing surface of a first material;
a second seal ring disposed about said journal pin and having a facing surface of a second non-elastomeric material with a hardness less than 300 HB, said first material being at least two times harder than said second non-elastomeric material;
an energizing ring disposed about said journal pin and disposed between said bit body and said second seal ring and biasing said facing surface of said second seal ring into engagement with said facing surface of said first seal ring.

37. The drill bit of claim 36 wherein said facing surface of said second seal ring is of a material having a hardness of less than 100 HB.

38. The drill bit of claim 36 wherein said second seal ring includes an annular extending portion that is secured within a groove formed in said cone cutter.

39. The drill bit of claim 38 wherein said extending portion is made by melting metal into said groove.

40. The drill bit of claim 39 further comprising surface finishing said metal in said groove.

41. The drill bit of claim 36 further comprising a third seal ring disposed about said journal pin and having a third facing surface, wherein said second seal ring is retained on said third facing surface of said third seal ring.

42. The drill bit of claim 36 wherein said second non-elastomeric material is metallic.

43. The drill bit of claim 42 wherein said second non-elastomeric material is at least one metal chosen from the group consisting of tin, copper, aluminum, magnesium, lead and alloys thereof.

44. An earth boring bit comprising:
a bit body;
a bearing shaft extending from said bit body;
a cutter mounted for rotation on said bearing shaft, said cutter including a bore receiving said shaft, said bore including intersecting axial and radial surfaces forming a seal gland;
a seal assembly disposed in said seal gland, said seal assembly comprising:
a static seal ring disposed about said shaft and having a facing surface made of a first material having a hardness greater than 300 HB;
a first dynamic seal ring disposed about said shaft and having a facing surface made of a second non-elastomeric material having a hardness less than 300 HB and being in dynamic contact with said facing surface of said static seal ring, wherein said facing surface of said static seal ring is made of a material that is at least two times harder than the non-elastomeric material of said facing surface of said first dynamic seal ring.

45. The drill bit of claim 44 wherein said axial surface of said seal gland is substantially perpendicular to the longitudinal axis of said bearing shaft; and
wherein said first dynamic seal ring is secured to said axial surface.

46. The drill bit of claim 44 wherein said seal assembly further comprises a second dynamic seal ring disposed about said journal shaft and having a facing surface, wherein said first dynamic seal ring is secured to said facing surface of said second dynamic seal ring.

47. The drill bit of claim 44 wherein said seal assembly further comprises a resilient energizer disposed between said static seal ring and said bit body for urging said facing surface of said static seal ring into engagement with said facing surface of said first dynamic seal ring.

48. The drill bit of claim 44 wherein said facing surface of said first dynamic seal ring is made of material having a hardness less than 150 HB.

49. The drill bit of claim 48 wherein said facing surface of said first dynamic seal ring is metallic.

50. The drill bit of claim 45 wherein said facing surface of said static seal ring is made of material that is harder than the material forming said axial surface of said seal gland; and wherein said axial surface of said seal gland is made of a material that is harder than the material of said facing surface of said first dynamic seal ring.

51. The drill bit of claim 46 wherein said facing surface of said static seal ring is made of a material that is harder than the material forming said facing surface of said second dynamic seal ring;
and wherein said facing surface of said second dynamic seal ring is harder than said facing surface of said first dynamic seal ring.

52. The drill bit of claim 44 wherein said facing surface of said first dynamic seal ring has a hardness less than 100 HB.

53. The drill bit of claim 52 wherein said facing surface of said first dynamic seal ring is at least one metal chosen from the group consisting of tin, copper, aluminum, magnesium, lead and alloys thereof.

54. A drill bit for drilling through earthen formations comprising:
a bit body;
a journal shaft extending from said bit body and having a generally cylindrical shaft surface;
a cutter rotatably mounted on said journal shaft and having a central bore receiving said shaft;
a recess in said central bore for receiving a seal assembly, said recess including an axial surface generally perpendicular to the axis of said journal shaft and a radial surface being an annular surface that is generally concentric with said shaft surface;
a seal assembly disposed in said seal recess, said seal assembly comprising:
a first seal ring having a facing surface made of non-elastomeric material having a hardness that is less than 300 HB and greater than 1 HB;
a second seal ring having a facing surface engaging said facing surface of said first seal ring and made of material having a hardness greater than 300 HB.

55. The drill bit of claim 54 wherein said first seal ring is attached to said axial surface of said seal recess;
and wherein said seal assembly further comprises a resilient energizer disposed about said journal shaft between said second seal ring and said bit body for urging said second seal ring into engagement with said facing surface of said first seal ring.

56. The drill bit of claim 54 wherein said seal assembly further comprises a third seal ring,
and wherein said first seal ring is attached to said third seal ring.

* * * * *